J. H. SCHLAFLY.
CULVERT.
APPLICATION FILED SEPT. 16, 1908.
934,574.
Patented Sept. 21, 1909.
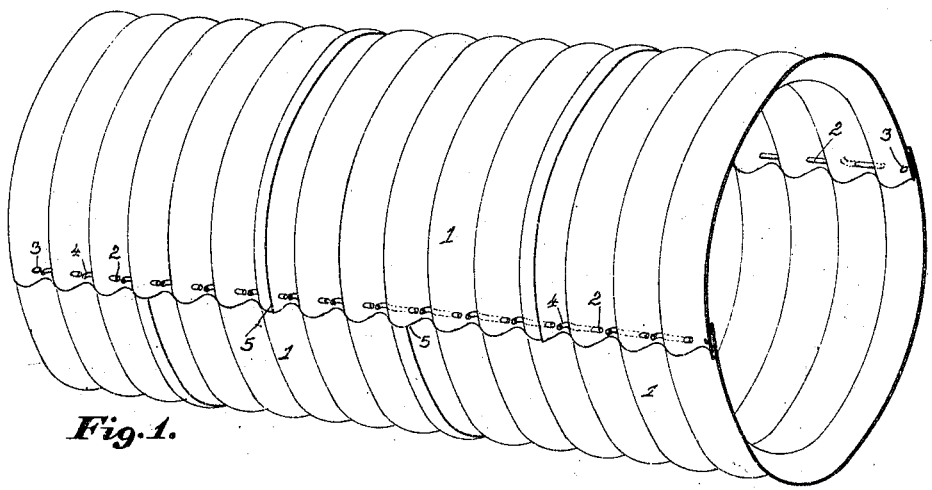
Fig.1.
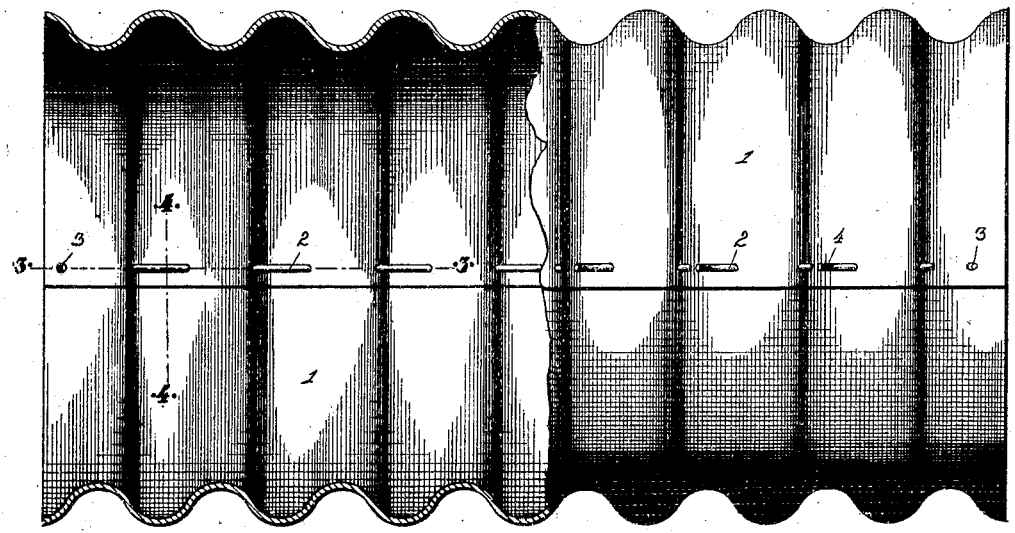
Fig.2.
Fig.3.
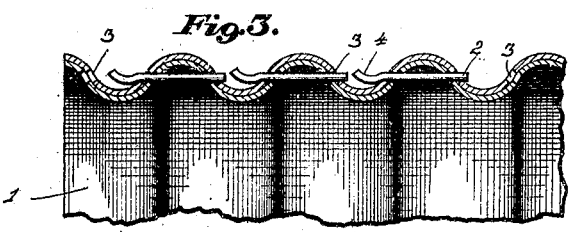
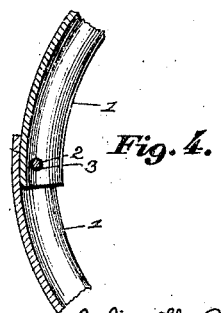
Fig.4.
Fig.5.
Witnesses
Harry O. Rostetter
Sylvia Borou
Inventor
Julius H. Schlafly
By Bond + Miller
Attorneys

UNITED STATES PATENT OFFICE.

JULIUS H. SCHLAFLY, OF CANTON, OHIO, ASSIGNOR TO THE CANTON CULVERT COMPANY, OF CANTON, OHIO, A CORPORATION OF OHIO.

CULVERT.

934,574. Specification of Letters Patent. Patented Sept. 21, 1909.

Application filed September 16, 1908. Serial No. 453,262.

*To all whom it may concern:*

Be it known that I, JULIUS H. SCHLAFLY, residing at Canton, in the county of Stark and State of Ohio, have invented certain new and useful Improvements in Culverts, of which the following is a specification.

In certain instances it is desirable to form the sections of culverts or pipe of comparatively thin metal and to so form the sections that they can be shipped from the place of manufacture to various distributing points in a nested condition; but when shipped in a nested condition it is necessary to connect and assemble the various sections going to make up a culvert or pipe and hence it is of importance to provide means whereby the various sections can be easily, with little expense and without the aid of skilled mechanics, connected at the place or places where the culvert or pipe is to be placed for use.

My invention is designed to provide means whereby the objects above pointed out can be easily accomplished.

The invention can be easily understood in connection with the following description taken in connection with the accompanying drawing, in which—

Figure 1 is a perspective view showing a number of sections or members connected together to produce a pipe or culvert. Fig. 2 is a view showing a portion of the pipe in longitudinal section. Fig. 3 is a sectional view taken on line 3—3, Fig. 2. Fig. 4 is a sectional view taken on line 4—4, Fig. 2. Fig. 5 is a detached view of one of the connecting pins or bars.

Similar numerals of reference indicate corresponding parts in all the figures of the drawing.

In the drawing, 1 represents the culvert or pipe sections which are preferably semi-circular and formed of any size desired, reference being had to the diameter of the pipe or culvert to be constructed. When two or more sections are joined together as hereinafter described, they will produce a pipe or culvert, which is cylindrical in cross section as shown, but it will be understood that other forms may be employed without departing from the nature of my invention, as the only object is to provide sections adapted to be nested for shipment and when connected together to produce a culvert or pipe. The various sections are provided with circumferential corrugations.

For the purpose of providing means for connecting the various sections together or in other words joining the top and bottom members to each other connecting pins or bars 2 are employed, which pins or bars are passed through apertures 3 formed in the convexed portions of the corrugations.

For the purpose of more conveniently threading the pins or bars 2 through the apertures 3 one end of each pin or bar may be curved as shown at 4. In the drawings I have illustrated the pins 2 threaded through each and every corrugation, but in use this may not be necessary and hence I do not desire to be confined to the exact construction illustrated; that is to say a separate pin for each corrugation. It will be understood that by my peculiar manner of connecting the lapped edges of the semi-circular sections 1 no lateral flanges are necessary nor is it necessary to provide rivets or bolts such as are commonly used for the purpose of connecting the flanged culvert sections together. In the drawings I have illustrated the bars or pins formed of a length to couple but a single lapped corrugation but it is evident that the pins may be formed of any desired length so that a single bar may be employed to connect two or more corrugations or in other words connect a greater proportionate length of the sections.

It is well understood that a number of sections 1 must necessarily be joined together endwise in order to produce a culvert or pipe of a length greater than the length of any two sections. In Fig. 1 I have illustrated a number of sections so connected together and the pins located through the lapped ends as well as the lapped edges whereby the transverse and longitudinal joints are connected, this being best illustrated at 5 Fig. 1.

Having fully described my invention what I claim as new and desire to secure by Letters Patent, is—

1. In a culvert of the class described, a series of sections adapted to be lapped longitudinally one upon the other at their edges and longitudinally disposed pins threaded through apertures in the overlapping portions for connecting their lapped edges together, substantially as and for the purpose specified.

2. A culvert consisting of a series of corrugated sections, the edges of said corrugated sections lapped one upon the other, the corrugations of the interior edge fitting the corrugations of the exterior edge, the sides of a corrugation of the exterior edge provided with apertures, the interior edge provided with apertures corresponding to and registering with the apertures in the exterior edge and a longitudinally disposed pin extending through the registering apertures of the two sides of the corrugation.

3. As an improved article of manufacture, a flangeless culvert section the longitudinal seam edges of said section provided with apertures, and pins arranged parallel with the axis of the culvert and threaded through the said apertures in the said edges, for the purpose of pinning said edges together.

4. In a culvert, a series of culvert sections formed of sheet metal, the longitudinal seam edges of said sections adapted to be lapped one upon the other, said lapped edges provided with apertures in pairs, the apertures of each pair being arranged in a line parallel with the longitudinal axis of the culvert, and pins adapted to be threaded longitudinally through the apertures in pairs, substantially as and for the purpose specified.

5. In a culvert, a series of culvert sections formed of sheet metal, the edges of said sections adapted to be lapped one upon the other, said lapped edges provided with apertures and pins provided with curved ends threaded through the apertures, substantially as and for the purpose specified.

6. As an improved article of manufacture, a sheet metal culvert consisting of a series of corrugated sections, the corrugations adapted to be lapped face to face and longitudinally disposed pins for connecting the lapped corrugations together, substantially as and for the purpose specified.

7. As an improved article of manufacture, a metal culvert consisting of a series of sections, said sections adapted to be lapped face to face and one section lapped within the other, longitudinally, and separate, longitudinally disposed pins for connecting the longitudinally lapped edges together, substantially as and for the purpose specified.

8. A culvert or drain pipe composed of corrugated sections overlapping at the ends of the corrugations, with the circumferential half of one section exterior to the adjacent section, and the other circumferential half at the interior of said adjacent section, and fastening devices consisting of separate, longitudinally disposed pins extending through apertures in the sides of the corrugations at the lap seams for securing the sections together.

9. A culvert composed of corrugated sections overlapping at the ends of the corrugations, with the circumferential half of one section exterior to the longitudinally adjacent section, and the other circumferential half at the interior of its longitudinally adjacent section, and fastening devices, consisting of longitudinally disposed pins extending through apertures in the sides of the corrugations along the longitudinal seams for securing the sections together.

10. A culvert composed of trough-like sections having overlapping side edges, and separate devices extending longitudinally of said sections engaging said overlapping side edges to secure the same together.

11. A culvert comprising trough-like sections having overlapping edges provided with apertured portions, registering longitudinally of the culvert and rods or pins engaging said apertured portions to secure the sections together.

12. A culvert comprising trough-like sections having alternate transversely raised and depressed portions overlapping at their edges, similar portions of the several sections being provided with apertures registering longitudinally of the culvert, and separate rods or pins engaging said apertured portions to secure the sections together.

13. A culvert comprising trough-like sections overlapping at their edges, and devices engaging and detachable longitudinally of said edges for securing the same together.

14. A culvert comprising in part a section overlapping at its adjoining edges, and a rod or pin engaging at separated points interfitting portions of said edges for securing them together.

15. A culvert comprising trough-like sections having their edges overlapping whereby one edge of the upper section is on the outside of the lower section and its opposite edge inside said section, and rods engaging registering portions of the overlapping edges at separated points for securing the overlapped edges together.

16. A culvert comprising transversely corrugated trough-like sections having their edges overlapped whereby one edge of the upper section is on the outside of the lower section and its opposite edge inside said section, and rods engaging registering portions of the overlapping edges at separated points for securing the overlapped edges together.

17. A culvert comprising a series of longitudinally divided sections overlapped at their ends and having relatively raised and depressed portions, in combination with means for engaging said raised and depressed portions for securing the ends together, said means also securing the edges of the divided sections together.

18. A culvert comprising adjoining sections overlapped at their edges and ends, and means engaging said overlapped edges longitudinally of the sections preventing relative rotation of the sections at said ends.

19. A culvert comprising longitudinally divided transversely corrugated sections overlapping at their ends, and means extending longitudinally of the sections engaging corrugated portions near said overlapped ends for securing the sections together and in place.

20. A culvert comprising trough-like sections arranged in break-joint relation and overlapping at their edges and ends, and single means for both securing the sections together at their edges and preventing relative rotation thereof.

21. A culvert comprising transversely corrugated trough-like sections arranged in break-joint relation and overlapping at their edges and ends, and single means for both securing the overlapping edges of the sections together and maintaining the engagement of the adjoining end portions.

22. A culvert comprising a tubular member having overlapped edges formed with complementary registering portions and a fastening device extending longitudinally of said member directly engaging said complementary registering portions of said overlapping edges to secure the same together.

23. A culvert comprising a tubular member having adjoining edges overlapped circumferentially and provided with openings adapted to register, and a removable rod or pin engaging said open portions to secure said adjoining edges together.

24. A culvert comprising a tubular member having adjoining edges formed with securing portions adapted to overlap to bring said securing portions into registration, and a rod or pin adapted to engage said securing portions longitudinally of the culvert to fasten said adjoining edges together.

25. A culvert comprising a tubular member having adjoining edges overlapped circumferentially and formed with complementary securing portions adapted to register, and a rod or pin adapted to engage said securing portions to fasten said adjoining edges together.

In testimony that I claim the above, I have hereunto subscribed my name in the presence of two witnesses.

JULIUS H. SCHLAFLY.

Witnesses:
　CHAS. W. KRIEG,
　KENNETH R. JENSON.